(No Model.)
L. F. R. RENNOLDS.
COTTON PRESS.
No. 258,118. Patented May 16, 1882.
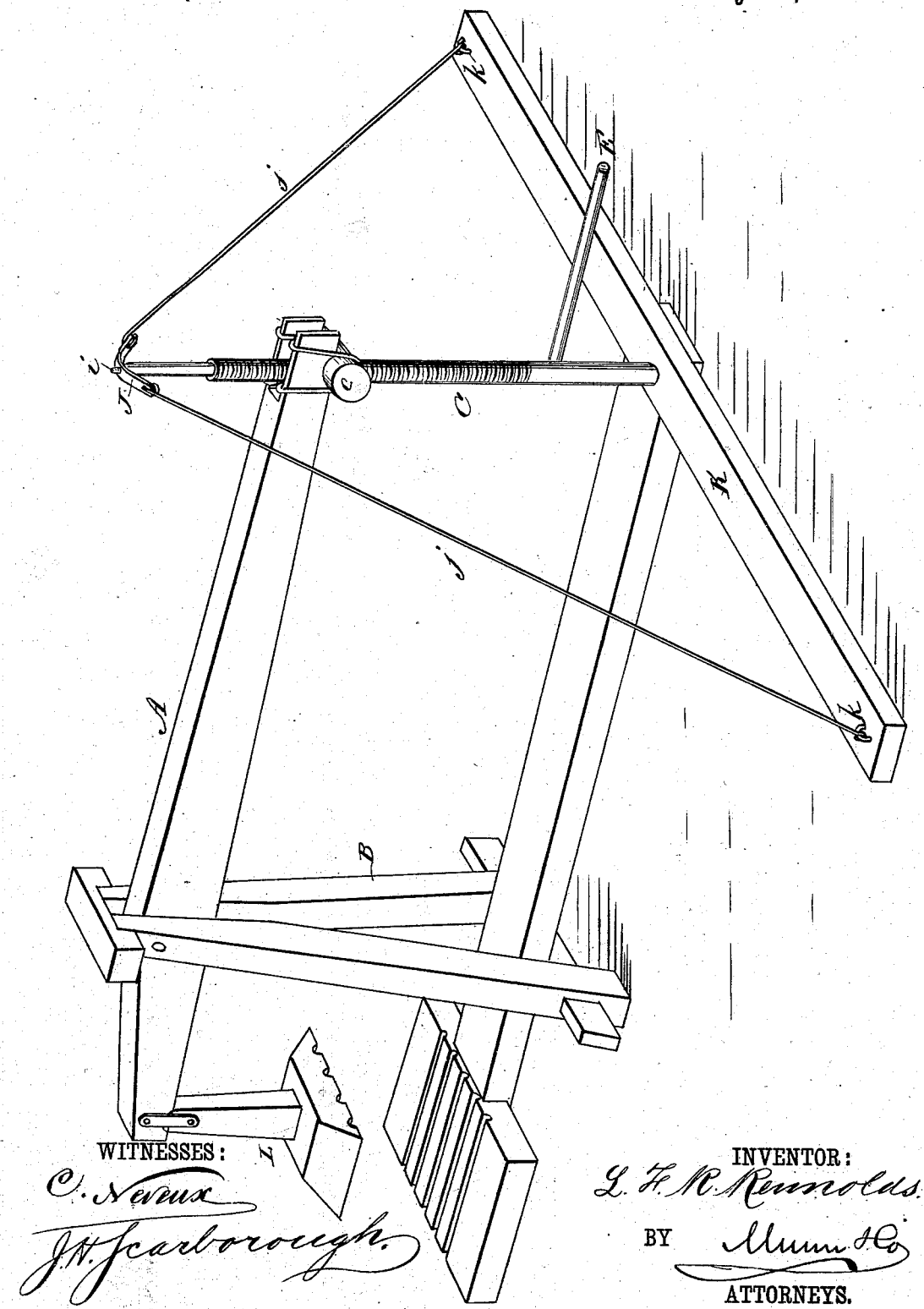
WITNESSES:
C. Neveux
J. H. Scarborough.
INVENTOR:
L. F. R. Rennolds.
BY Munn & Co
ATTORNEYS.
N. PETERS. Photo-Lithographer, Washington, D. C.

UNITED STATES PATENT OFFICE.

LEWIS F. R. RENNOLDS, OF CLAIBORNE PARISH, LOUISIANA.

COTTON-PRESS.

SPECIFICATION forming part of Letters Patent No. 258,118, dated May 16, 1882.

Application filed June 15, 1881. (No model.)

*To all whom it may concern:*

Be it known that I, LEWIS F. R. RENNOLDS, of Claiborne parish, Louisiana, have invented a new and useful Improvement in Cotton-Presses, of which the following is a full, clear, and exact specification.

My invention relates to that class of cotton-presses which employ a long lever pivoted in a frame and a vertical screw-shaft which passes through the long arm of the lever, the screw-shaft being adapted to be revolved for raising and lowering the lever. The objection to this form of cotton-press, as ordinarily constructed, is that the screw-shaft under power is liable to cant over to the right or left and cause the lever to split, the press-box to give way, and thus form an uneven and ugly bale.

The object of my invention is to overcome these difficulties; and to this end my invention consists in adjusting to the top of the screw-shaft a movable cross-piece or collar, to which is attached suitable ropes, chains, or rods, which lead from thence, at or near right angles to the main lever, to suitable stays, to which they are attached for holding the screw-shaft against all danger of lateral canting or tipping when the power is applied.

In the accompanying drawing, the figure represents in perspective a cotton-press having my improvement attached.

A represents the main lever, which is of ordinary construction, and which is pivoted in the ordinary manner in the upright frame B; and C represents the vertical screw-shaft, which passes through the screw-block $c$, secured upon the long arm of the lever. The upper end of this screw-shaft is made conical or pointed, as shown at $i$, and upon this point or cone is placed the cross-piece or collar J, and to the ends of this collar or cross-piece are attached one end of the ropes, chains, or rods $jj$, which rods, chains, or ropes lead to and are secured in the staples or other suitable stays, $kk$, fastened preferably in the cross-sill K.

These ropes, chains, or rods are drawn taut through the stays, so that the screw-shaft shall always be in a vertical position and prevented from tipping to the right or left when power (horse or other power) is applied to the lever E for turning the shaft. If horse-power is used for turning the shaft, the staples $kk$ should be placed such distance from the screw-shaft that the chains, ropes, or rods will not interfere with the travel of the horse around the shaft.

The short arm of the lever A is provided with the ordinary swinging press-board, L, which enters in the ordinary way into the press-box for compressing the cotton and forming the bale. By this arrangement the screw-shaft may always be adjusted to a vertical position and held in that position while the power is being applied, which causes the power to be applied directly in the plane of movement of the press-lever, and this overcomes all the objections due to the liability of the shaft to tip or cant over.

The stays $kk$, instead of being placed in the cross-sill, may be placed in the ground, or the ropes, chains, or rods may be attached to any other suitable thing for holding the shaft securely in a vertical position.

I am aware that it is not new to use the main lever, screw-block, and screw-shaft in connection with a press, or to connect two presses by a separate lever with the same screw; but

What I claim as new and of my invention is—

In a cotton-press, the combination, with the main lever A and the screw-block $c$, of the vertical screw-shaft C, made conical at $i$, the collar J, secured at its middle upon the end of said screw, and the ropes $jj$, connecting said collar with the sill K, as shown and described.

LEWIS F. R. RENNOLDS.

Witnesses:
CHARLES E. McDONALD,
ISAAC SYLVERSTINE.